(12) United States Patent
Yang et al.

(10) Patent No.: US 11,454,311 B2
(45) Date of Patent: Sep. 27, 2022

(54) METHOD AND APPARATUS FOR CONTROLLING TRANSMISSION OIL TEMPERATURE

(71) Applicants: Hyundai Motor Company, Seoul (KR); Kia Motors Corporation, Seoul (KR)

(72) Inventors: Dae Won Yang, Gyeonggi-do (KR); Hak-Sung Lee, Gyeonggi-do (KR); Seong Hwan Kim, Gyeonggi-do (KR); Sang Hyun Jeong, Gyeonggi-do (KR); Gyeong Cheol Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 908 days.

(21) Appl. No.: 16/186,043

(22) Filed: Nov. 9, 2018

(65) Prior Publication Data
US 2019/0249763 A1   Aug. 15, 2019

(30) Foreign Application Priority Data

Feb. 12, 2018 (KR) .................. 10-2018-0016830

(51) Int. Cl.
| | |
|---|---|
| *F16H 57/04* | (2010.01) |
| *F01M 1/02* | (2006.01) |
| *F01M 5/00* | (2006.01) |
| *H02P 27/06* | (2006.01) |
| *H02P 29/62* | (2016.01) |

(52) U.S. Cl.
CPC .......... *F16H 57/0413* (2013.01); *F01M 1/02* (2013.01); *F01M 5/00* (2013.01); *F01M 5/001* (2013.01); *F01M 5/005* (2013.01); *F16H 57/0436* (2013.01); F01M 2001/0215 (2013.01); H02P 27/06 (2013.01); H02P 29/62 (2016.02)

(58) Field of Classification Search
CPC ... F16H 57/0413; F16H 57/0436; F01M 1/02; F01M 5/00; F01M 5/001; F01M 5/005; F01M 2001/0215
USPC ....................................... 701/33.4
See application file for complete search history.

(56) References Cited

U.S. PATENT DOCUMENTS

| | | | |
|---|---|---|---|
| 2014/0187382 A1* | 7/2014 | Kang | .................. F16H 61/0025 477/98 |
| 2015/0152757 A1* | 6/2015 | Barber | .................. F01M 5/001 123/304 |

FOREIGN PATENT DOCUMENTS

| | | |
|---|---|---|
| JP | 08-284907 | 1/1996 |
| KR | 10-1535030 B1 | 7/2015 |

* cited by examiner

*Primary Examiner* — Lindsay M Low
*Assistant Examiner* — Omar Morales
(74) *Attorney, Agent, or Firm* — Fox Rothschild LLP

(57) ABSTRACT

A method and apparatus for controlling transmission oil temperature are provided. The transmission oil is heated using a motor coil of an electric oil pump (EOP) as a heater before a startup of a vehicle. The method includes applying a current to the motor coil of the EOP configured to operate a transmission of the vehicle to thus heat the transmission oil by heat generated from the motor coil.

12 Claims, 6 Drawing Sheets

METHOD AND APPARATUS FOR CONTROLLING TRANSMISSION OIL TEMPERATURE

CROSS-REFERENCE(S) TO RELATED APPLICATIONS

This application claims priority to Korean Patent Application No. 10-2018-0016830, filed on Feb. 12, 2018, which is incorporated herein by reference in its entirety.

BACKGROUND

Field of the Disclosure

The present disclosure relates to a method and apparatus for controlling transmission oil temperature, and more particularly, to a method and apparatus for controlling transmission oil temperature, which is capable of adjusting the viscosity of transmission oil by adjusting the temperature of transmission oil in an ultra low temperature environment.

Description of Related Art

In general, a power train installed in a hybrid vehicle includes a separate electric oil pump (EOP), in addition to a mechanical oil pump installed in a transmission. When the hybrid vehicle is operated or driven in an electric vehicle mode, the hybrid vehicle has difficulties in providing sufficient hydraulic pressure required by the transmission, using only a hydraulic pressure discharged from the mechanical oil pump driven by a motor. Thus, the EOP is operated to compensate for the hydraulic pressure.

As disclosed in the prior art, the hybrid vehicle includes the EOP which supplies hydraulic oil required for driving an engine clutch and a transmission and an oil pump unit (OPU) which includes a pump controller configured to operate the EOP and a relay for controlling power supply to the EOP. The pump controller of the OPU transmits and receives information to and from a transmission control unit (TCU) that operates as an upper controller through controller area network (CAN) communication, and electronically operates the OPU based on a control signal applied from the TCU. The EOP basically includes a motor and pump, and drives the pump using power of the motor.

As illustrated in FIG. 5 of the related art, the viscosity of transmission oil of a vehicle changes according to oil temperature. In particular, the kinematic viscosity of the transmission oil significantly increases at an ultra-low temperature of −40° C. or less. When a hybrid vehicle is started in an environment such as an ultra-low temperature region where the outside temperature is extremely low, a mechanical oil pump installed in the hybrid vehicle is stopped, and an EOP is operated to form a hydraulic pressure of a transmission, to thus activate the vehicle.

However, when the hybrid vehicle is cold started, the viscosity of oil in the ultra-low temperature environment increases, and the oil viscosity of the EOP is not formed stably. Therefore, the start of the hybrid vehicle may not be immediately performed, that is, the start may be delayed. Therefore, the EOP and the OPU need to be designed to be driven by a high torque and high current, based on the viscosity characteristic of automatic transmission oil (ATF), when the hybrid vehicle is driven in an ultra-low temperature environment. In other words, since the capacities of the motor of the EOP and the power module of the OPU are set to correspond to a high torque/high current at an ultra-low temperature, the EOP and the OPU are designed to have an over-spec capacity, based on a normal operation region. The over spec in the design of the EOP and the OPU may cause an increase in the manufacturing cost of the vehicle.

SUMMARY

The present disclosure is directed to a method and apparatus for controlling transmission oil temperature, which are capable of heating transmission oil using a motor coil of an EOP as a heater before a startup of a vehicle, thereby preventing a problem caused by a viscosity change of oil under an ultra-low temperature environment. Other objects and advantages of the present disclosure may be understood by the following description, and become apparent with reference to the exemplary embodiments of the present disclosure. Also, it is obvious to those skilled in the art to which the present disclosure pertains that the objects and advantages of the present disclosure may be realized by the means as claimed and combinations thereof.

In accordance with an exemplary embodiment of the present disclosure, a method for controlling a temperature of transmission oil of a vehicle may be executed by an electric oil pump (EOP) configured to operate a transmission for a vehicle and a controller (TCU) configured to operate the EOP.

In particular, the method may include applying, by the TCU, a current to a motor coil of the EOP to heat the transmission oil by heat generated from the motor coil. The current may be applied to the motor coil by an operation of a field-effect transistor (FET) controller installed within an oil pump unit (OPU) to adjust power supply to the EOP. The current may be applied to the motor coil before the vehicle is started. When a release of a driver door lock device of the vehicle is sensed, the TCU may start control to apply a current to the motor coil.

Additionally, the method may include stopping, by the TCU, the transmission oil heating control by the motor coil, after the startup of the vehicle. In particular, the TCU may be configured to stop the transmission oil heating control by the motor coil, when the current is applied to the motor coil for a predetermined period of time or more. Additionally, the TCU may be configured to stop the transmission oil heating control by the motor coil, when the driver door lock device of the vehicle is released and then returns to a locking mode. The TCU may also be configured to start the transmission oil heating control when the temperature of the transmission oil is less than a predetermined value. Further, the TCU may be configured to start the transmission oil heating control when the outside temperature is equal to or less than a predetermined value.

In accordance with another exemplary embodiment of the present disclosure, an apparatus for controlling transmission oil temperature may include: an EOP configured to operate a transmission for a vehicle; and a TCU configured to operate the EOP. The TCU may be configured to apply a current to a motor coil of the EOP to heat the transmission oil by heat generated from the motor coil.

The apparatus may further include an OPU configured to adjust power supply to the EOP. The TCU may be configured to operate a FET control unit installed within the OPU, such that the current is applied to the motor coil of the EOP. The apparatus may further include a door lock sensing device configured to sense whether a driver door lock device of the vehicle is released. When a release of the driver door lock device of the vehicle is sensed using the door lock sensing device, the TCU may be configured to start applying a current to the motor coil.

The apparatus may further include an oil temperature sensor configured to sense a temperature of the transmission oil. When the temperature of the transmission oil, sensed by the oil temperature sensor, is less than a predetermined value, the TCU may be configured to start the transmission oil heating control. The apparatus may further include an outside temperature sensor configured to sense an outside temperature of the vehicle. When the outside temperature sensed by the oil temperature sensor is equal to or less than a predetermined value, the TCU may be configured to start the transmission oil heating control. Additionally, the apparatus may include a power supply device configured to supply power to the TCU and the OPU to start operation, when a release of the driver door lock device of the vehicle is sensed using the door lock sensing device.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
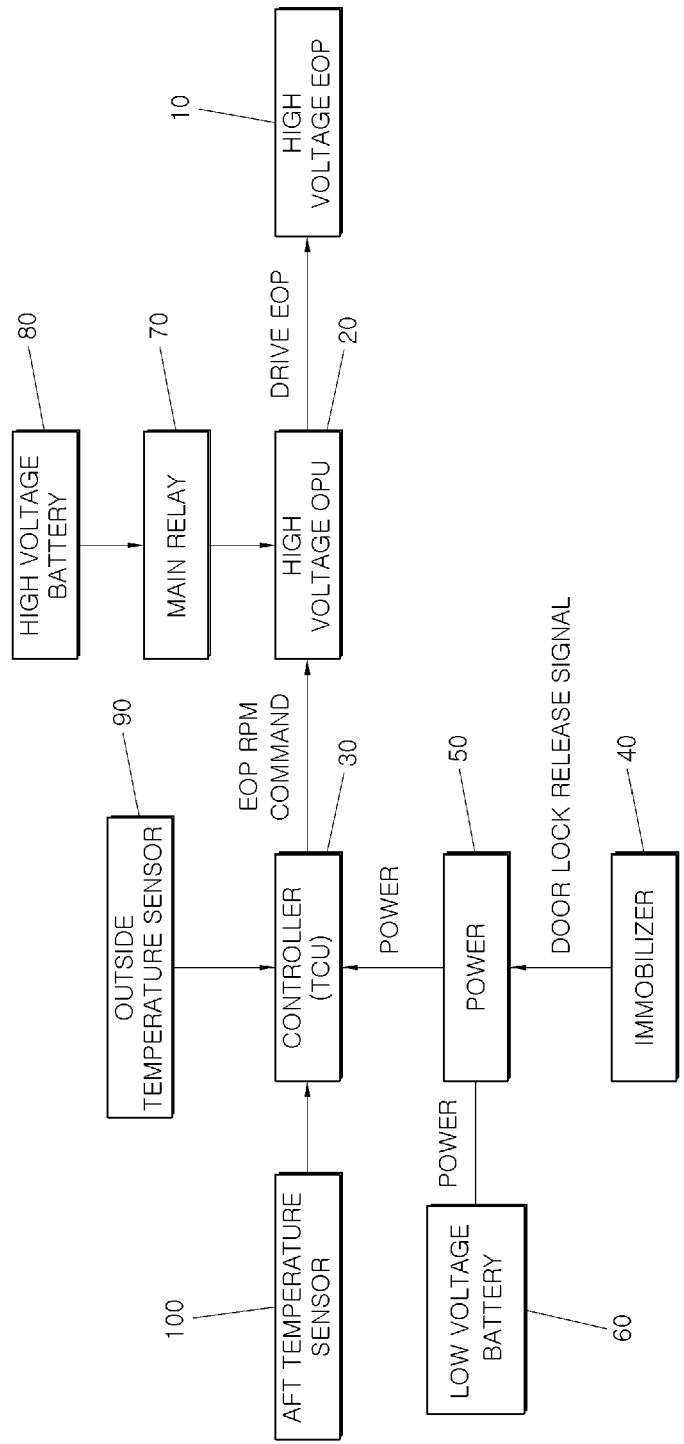
FIG. 1 is a block diagram illustrating the configuration of an apparatus for controlling transmission oil temperature according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereafter, exemplary embodiments of the present disclosure will be described in more detail with reference to the accompanying drawings.

FIG. 1 is a block diagram illustrating the configuration of an apparatus for controlling transmission oil temperature according to an exemplary embodiment of the present disclosure. The apparatus for controlling transmission oil temperature according the exemplary embodiment of the present disclosure may include an electric oil pump (EOP) 10 configured to operate a transmission for a vehicle and a controller (TCU) 30 configured to operate the EOP 10.

Figure 2:
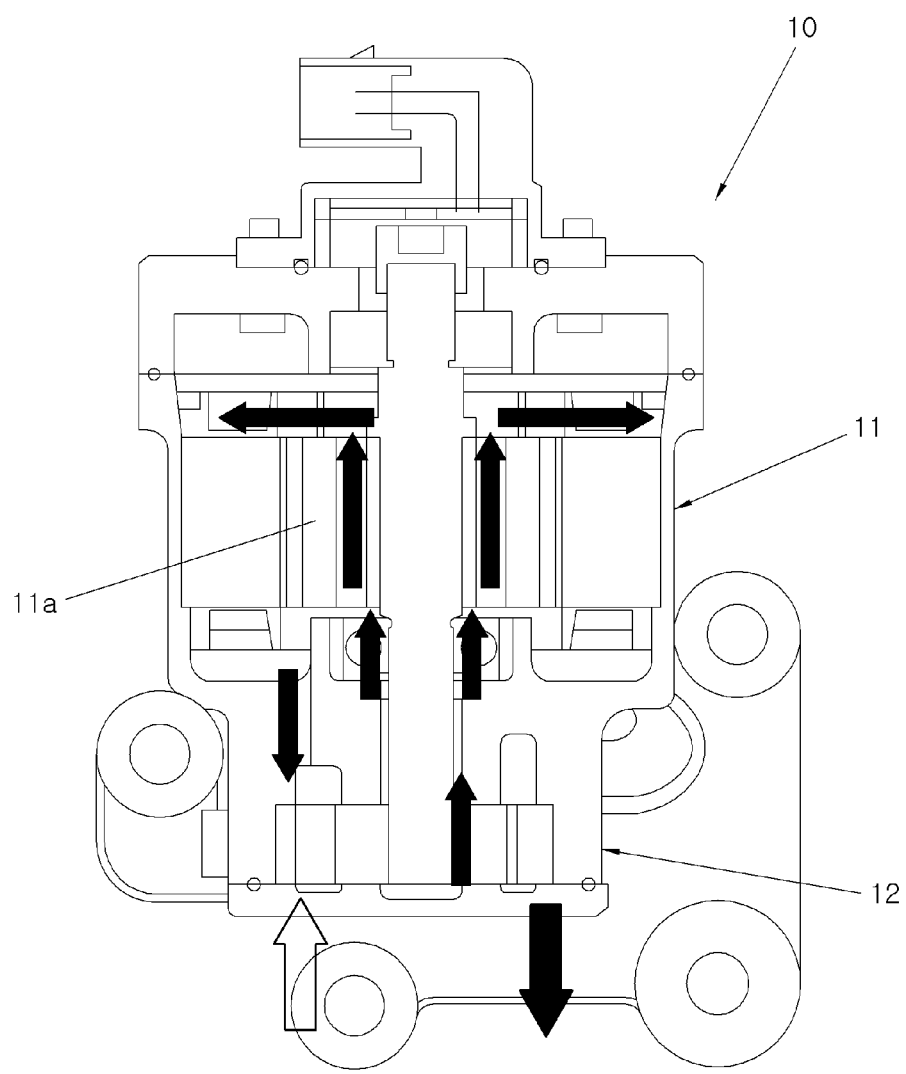
FIG. 2 is a cross-sectional view illustrating an EOP according to an exemplary embodiment of the present disclosure.

The EOP 10 may be configured to suction oil stored in an oil pan (not illustrated), and supply the oil to the transmission or a motor which requires cooling or lubrication. The EOP 10 may include a motor 11 and a pump 12. The motor 11 may be configured to drive the EOP to operate at a predetermined number of revolutions (e.g., revolutions per minute), and the pump 12 may be configured to pump oil through the operation of the motor, and supply the pumped oil to the transmission. As illustrated in FIG. 2, the EOP may be operated to circulate transmission oil through a motor coil 11a of the motor 11 to coil and lubricate the motor coil 11a. The prevent disclosure thus provides a structure in which the motor coil 11a operates as a heater to heat transmission oil and thus, the transmission oil may increase to a predetermined temperature range before a startup of the vehicle.

To utilize the motor coil 11a of the EOP 10 as a heater, a predetermined current needs to be applied to the motor coil 11a of the EOP 10, before the vehicle is started. Since an oil pump unit (OPU) 20 may be configured to operate the EOP 10, the TCU 30 may be configured to transmit a predetermined command to the OPU 20 via CAN communication to perform the above-described control. The OPU 20 may include a high voltage battery 80 configured to supply high-voltage power to the EOP 10 and a main relay 79 configured to adjust power to the EOP 10.

Figure 4:
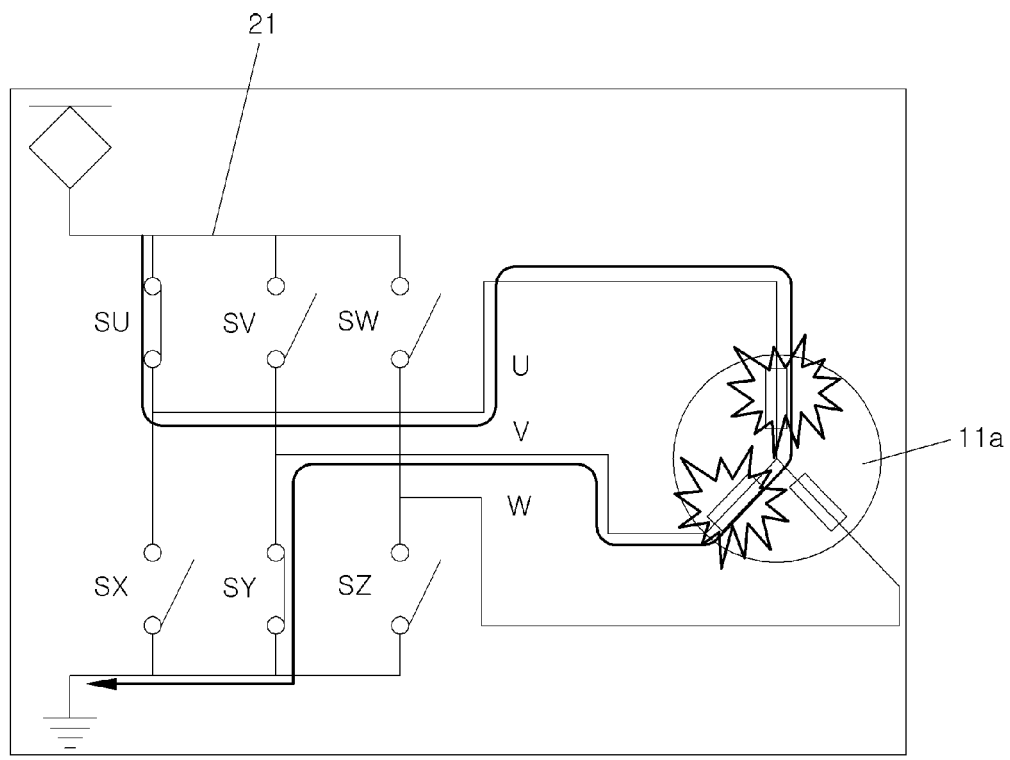
FIG. 4 is a diagram for describing heating control on a motor coil of the EOP through an operation of an FET control unit according to an exemplary embodiment of the present disclosure.
Figure 5:
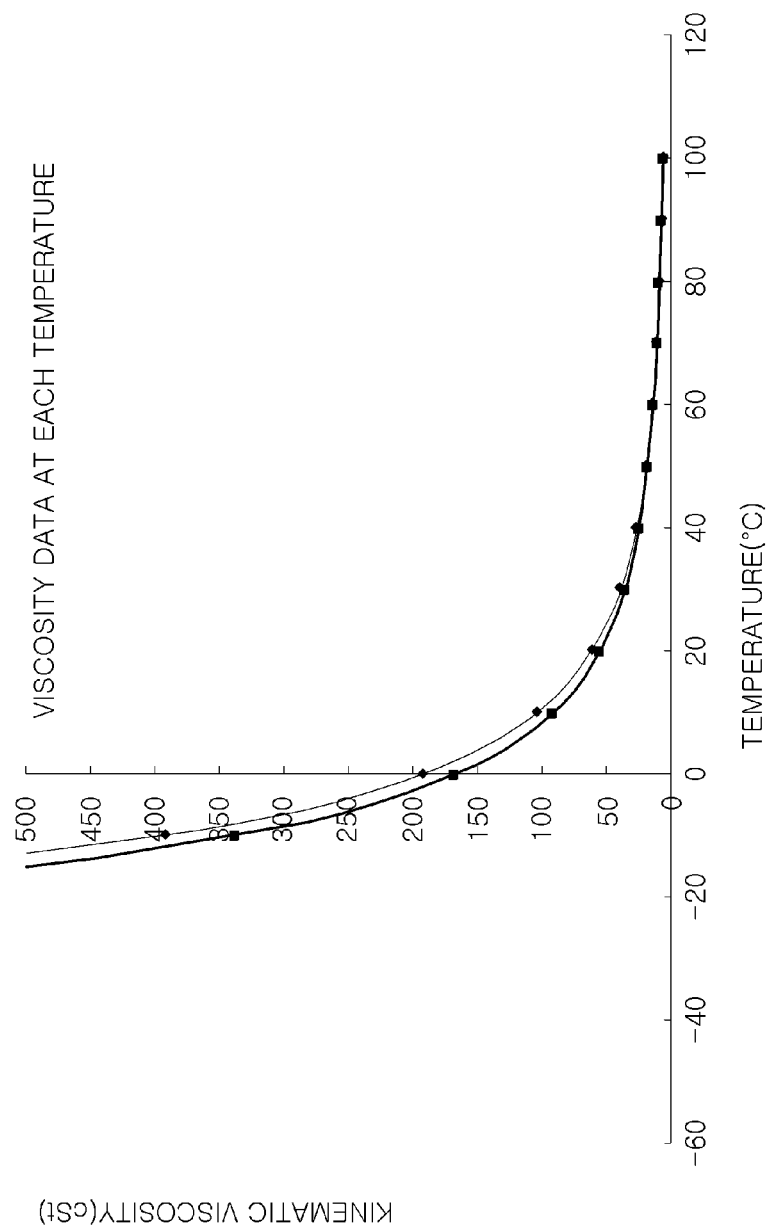
FIG. 5 is a graph illustrating the relation between the temperature and viscosity of transmission oil according to an exemplary embodiment of the present disclosure.

As illustrated in FIG. 4, the OPU 20 may include a PET controller 21 configured to apply a current to the motor coil 11a before a startup of the vehicle. As illustrated in FIG. 4, the FET controller 21 may provide power supplied from the high voltage battery 80 as a high-frequency current to the motor coil 11a based on a signal input from the TCU 30. When a high-frequency current is applied to the motor coil 11a, a magnetic field is generated to induce an eddy current in the transmission oil flowing through the motor coil 11a, thereby heating the transmission oil. In other words, the motor coil 11a may be utilized as a heater for heating the transmission oil.

The transmission oil heating control using the motor coil 11a may be effectively applied in an ultra-low temperature environment of about −40° C. or less, for example. Therefore, the apparatus for controlling transmission oil temperature may include an outside temperature sensor 90 configured to measure the outside temperature of the vehicle, and the TCU 30 may be configured to determine whether to perform the transmission oil heating control using the motor coil 11a based on the outside temperature measured by the outside temperature sensor 90. In other words, when the outside temperature is greater than a predetermined temperature range (for example, −10° C. or more), the TCU 30 may be configured to determine that there is no problem in controlling a startup of the vehicle, and not perform the transmission oil heating control using the motor coil 11a.

As described above, the viscosity of the transmission oil has a correlation with the temperature of the transmission oil. Therefore, the apparatus may include an oil temperature sensor 100 installed within the oil pan (not illustrated) and configured to measure the temperature of the transmission oil. The TCU 30 may then be configured to determine whether to perform transmission oil heating control using the motor coil 11a, based on the temperature of the transmission oil, which is measured using the oil temperature sensor 100. When the oil temperature is within a predetermined temperature range even though the outside temperature is less than the predetermined temperature range, the TCU 30 may be configured to determine that there is no problem in controlling a startup of the vehicle, and not perform the transmission oil heating control using the motor coil 11a.

Additionally, to smoothly start the vehicle using the transmission oil heating control using the motor coil 11a, the transmission oil heating control needs to be performed before the vehicle is started. In other words, before the vehicle is started, the FET controller 21 of the OPU 20 may be operated to apply a current to the EOP 10 to thus increase the temperature of oil to the predetermined temperature range when the vehicle is started. In general, a driver releases the door lock of a driver seat using a smart key or the like, and enters the driver seat to start a vehicle. Thus, when a driver door lock release signal is received, the TCU 30 may be configured to determine that the driver has an intention to start the vehicle, and thus, may be configured to start the transmission oil heating control.

For this operation, the apparatus for controlling transmission oil temperature according to the exemplary embodiment of the present disclosure may include an immobilizer 40, a low voltage battery 60 and a relay 50. The immobilizer 40 is a device which assigns a unique password to each key, checks the password to control a startup, and inhibits a person from driving the vehicle without authority, to prevent a theft of the vehicle. In other words, the immobilizer 40 operates as an authentication device. While the engine is turned off (e.g., ACC, ON), the low voltage battery 60 may supply power to a radio, air-conditioner, multimedia device and the like other than an engine startup, such that the devices may be operated.

When receiving a door lock release signal from the smart key of the driver, the immobilizer 40 may be configured to transmit the door lock release signal to the relay 50, such that the relay 50 supplies power from the low voltage battery 60 to the TCU 30. When power is supplied from the relay 50, the TCU 30 may be awaken from a sleep mode, and operate the OPU 20 such that transmission oil heating control using the motor coil 11a may be performed under a predetermined driving condition.

Figure 3A:
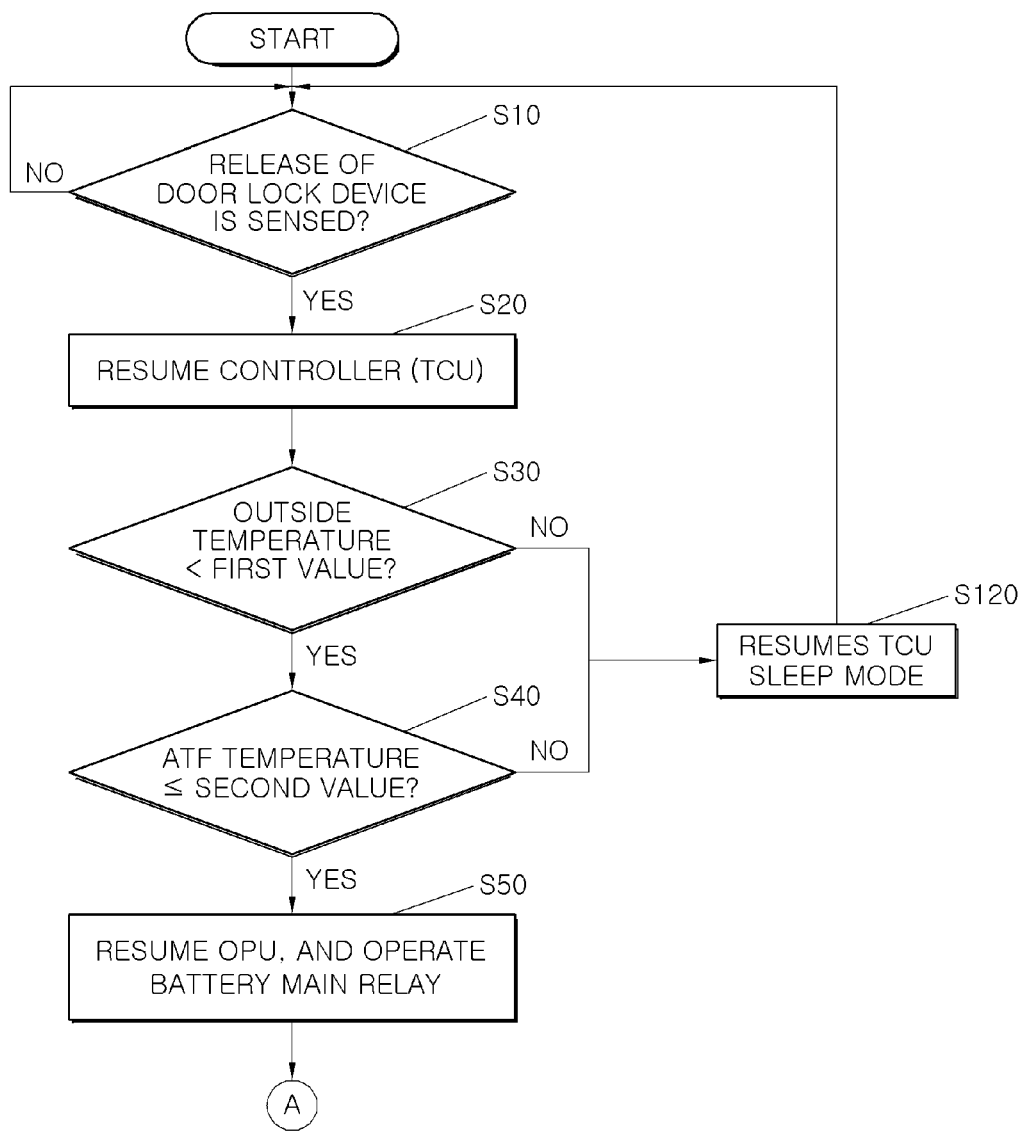
FIG. 3A-3B are flowcharts illustrating a method for controlling transmission oil temperature according to an exemplary embodiment of the present disclosure.
Figure 3B:
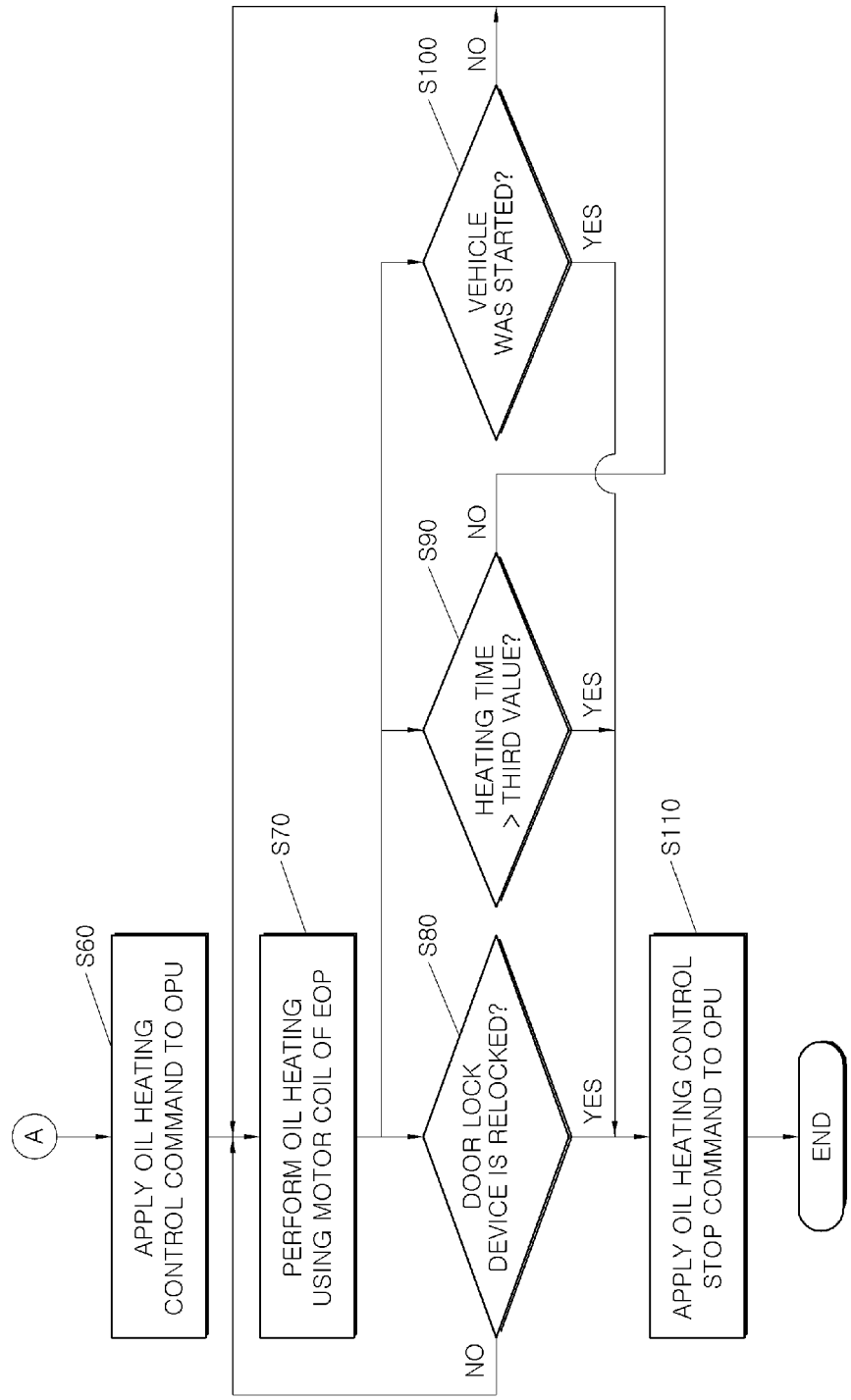

FIGS. 3A-3B are flowcharts illustrating a method for controlling transmission oil temperature according to an exemplary embodiment of the present disclosure, which may be used for the operation of the apparatus for controlling transmission oil temperature in FIG. 1. Referring to FIG. 3, the method may include determining, by the immobilizer 40, whether a release signal for the door lock device of the vehicle is sensed, at step S10. When the release signal for the door lock device of the vehicle was sensed, the door lock release signal may be transmitted by the immobilizer 40 to the relay 50 to cause the relay 50 to supply power from the low voltage battery 60 to the TCU 30.

When the power is supplied from the relay 50, the TCU 30 may be awaken from the sleep mode and then resumes an operation at step S20. After the operation is resumed, the method may include measuring, by the TCU 30, an outside temperature using the outside temperature sensor 90, and determining whether to operate the OPU 20 based on the measured value, at step S30. Furthermore, the method may include measuring, by the TCU 30, the current temperature of transmission oil using the transmission oil temperature sensor 100, and determining whether to operate the OPU 20 based on the measured value, at step S40.

When the outside temperature measurement result is less than a first value or the oil temperature is equal to or less than a second value, the TCU 30 may be configured to determine that the viscosity of the oil is extremely or excessively high and likely to cause a problem during a startup of the vehicle. Then, the TCU 30 may be configured to start to operate the OPU 20. When the outside temperature or the oil temperature falls within a proper range, the TCU 30 may be configured to determine that there is no problem in starting the vehicle, and reenter the sleep mode, at step S120.

As described above, when the oil temperature is within the predetermined temperature range even though the outside temperature is less than the predetermined temperature range, the TCU 30 may be configured to determine that there is no problem in controlling a startup of the vehicle, and return to the sleep mode 120 without operating the OPU 20.

FIG. 3A-3B illustrate the process of determining whether to operate the OPU 20 based on the outside temperature and the transmission oil temperature which are measured using both the outside temperature sensor 90 and the transmission oil temperature sensor 100, but the present disclosure is not limited thereto. The apparatus for controlling transmission oil temperature may include only one of the outside temperature sensor 90 and the transmission oil temperature sensor 100, and determine whether to operate the OPU 20, using only a measured value of the only one of the sensors.

In response to determining to operate the OPU 20, the high voltage battery 80 and the main relay 70 may be operated by the TCU 30 to resume the operation of the OPU 20 at step S50. Then, a control command may be transmitted to the OPU 20 via CAN communication to apply a high-voltage current from the high voltage battery 80 to the motor coil 11a of the EOP 10 through the main relay 70, at step S60. The OPU 20 receiving the control command may be configured to one-phase close FET control using the FET controller 21, such that a current is applied to the motor coil 11a of the EOP 10. When a high-frequency current is applied to the motor coil 11a, a magnetic field is generated to induce an eddy current in the transmission oil flowing through the motor coil 11a, thereby heating the transmission oil, at step S70.

When a predetermined heating end condition is satisfied after the heating of the transmission oil is started by the motor coil 11a, the TCU 30 may be configured to transmit a transmission oil heating control stop command to the OPU 20 at step S110. For example, when a relocking signal for a driver door lock device is received through the immobilizer 40, the TCU 30 may be configured to determine that the driver has no intention to start the vehicle. Therefore, when the relocking signal for the door lock device is received, the TCU 30 may be configured to determine whether the door lock is switched from the unlocked state to the locked state, at step S80. When the door is switched to the locked state, the TCU 30 may be configured to transmit the transmission oil heating control stop command to the OPU 20 at step S110.

Furthermore, the TCU 30 may be configured to determine whether the heating time of the transmission oil by the motor coil 11a exceeds a predetermined value (third value), at step S90. When the heating time exceeds the third value, the TCU 30 may be configured to determine that the temperature of the transmission oil falls within a predetermined temperature range, since the transmission oil has been sufficiently heated. Then, the TCU 30 may be configured to transmit the transmission oil heating control stop command to the OPU 20 at step S110.

Moreover, the TCU 30 may be configured to determine whether the driver has already started the vehicle during the transmission oil heating control, at step S100. When the vehicle was started, the TCU 30 does not need to maintain the transmission oil heating control on the OPU 20. Therefore, the TCU 30 may be configured to transmit the transmission oil heating control stop command to the OPU 20 at step S100.

According to the exemplary embodiments of the present disclosure, the motor coil of the EOP 10 may be utilized as a heater to heat the transmission oil before a startup of the vehicle, which makes it possible to solve a problem caused by a viscosity change of the transmission oil under an ultra-low temperature environment. In particular, in consideration of operation in an ultra-low environment, the capacities of the motor of the EOP and the power module of the OPU do not need to be designed to be over-spec'ed more than needed. Therefore, the manufacturing cost of the vehicle may be reduced, and the power module of the EOP or the OPU may be reduced in size and weight, which makes it possible to reduce the weight of the vehicle.

In accordance with the exemplary embodiments of the present disclosure, the apparatus and method for controlling transmission oil temperature may guarantee a more stable startup of a vehicle in an ultra-low temperature environment. Furthermore, the apparatus and method may increase the temperature of transmission oil at an ultra-low temperature using heat generated from the motor coil of the EOP, thereby reducing the amount of torque and current required when the EOP and the OPU are initially driven. Therefore, the apparatus and method may reduce a necessary motor capacity when the EOP is designed, compared to the related art. Furthermore, the apparatus and method may optimize the spec of the power module when the OPU is designed, thereby reducing the manufacturing cost of the vehicle.

While the present disclosure has been described with respect to the specific exemplary embodiments, it will be apparent to those skilled in the art that various changes and modifications may be made without departing from the spirit and scope of the disclosure as defined in the following claims.

What is claimed is:

1. A method for controlling a temperature of transmission oil of a vehicle, comprising:
  applying, by a controller, a current to a motor coil of an electric oil pump (EOP) configured to operate a transmission of the vehicle to heat transmission oil by heat generated from the motor coil,
  wherein the current is applied to the motor coil before the vehicle is started when a door lock release signal is received.

2. The method of claim 1, wherein the applying of the current to the motor coil includes:
  operating, by the controller, a field-effect transistor (FET) controller installed within an oil pump unit (OPU) for adjusting power supply to the EOP.

3. The method of claim 1, further comprising:
  stopping, by the controller, a transmission oil heating control by the motor coil, after the startup of the vehicle.

4. The method of claim 1, further comprising:
  stopping, by the controller, a transmission oil heating control by the motor coil, when the current is applied to the motor coil for a predetermined period of time or greater.

5. The method of claim 1, further comprising:
  stopping, by the controller, a transmission oil heating control by the motor coil, when a door relocking signal is received.

6. The method of claim 1, further comprising:
  commencing, by the controller, a transmission oil heating control when the temperature of the transmission oil is less than a predetermined value.

7. The method of claim 1, further comprising:
  commencing, by the controller, a transmission oil heating control when the outside temperature is equal to or less than a predetermined value.

8. An apparatus for controlling transmission oil temperature, comprising:
  an electric oil pump (EOP) configured to operate a transmission for a vehicle; and
  a transmission control unit (TCU) configured to operate the EOP,
  wherein the TCU is configured to apply a current to a motor coil of the EOP to heat the transmission oil by heat generated from the motor coil and
  the TCU is configured to commence applying the current to the motor coil when a door lock release signal is received.

9. The apparatus of claim 8, further comprising:
  an oil pump unit (OPU) configured to adjust power supply to the EOP,
  wherein the TCU is configured to operate a field-effect transistor (FET) controller installed within the OPU to apply the current to the motor coil of the EOP.

10. The apparatus of claim 8, further comprising:
an oil temperature sensor configured to sense a temperature of the transmission oil,
wherein when the temperature of the transmission oil, sensed by the oil temperature sensor, is less than a predetermined value, the TCU is configured to start a transmission oil heating control.

11. The apparatus of claim 8, further comprising:
an outside temperature sensor configured to sense an outside temperature of the vehicle,
wherein when the outside temperature sensed by the oil temperature sensor is equal to or less than a predetermined value, the TCU is configured to start a transmission oil heating control.

12. The apparatus of claim 8, further comprising: a power supply device configured to supply power to the TCU and the OPU to start operation, when the door lock release signal is received.

\* \* \* \* \*